United States Patent
Obrador

(10) Patent No.: US 7,444,068 B2
(45) Date of Patent: Oct. 28, 2008

(54) SYSTEM AND METHOD OF MANUAL INDEXING OF IMAGE DATA

(75) Inventor: Pere Obrador, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 829 days.

(21) Appl. No.: 10/184,428

(22) Filed: Jun. 28, 2002

(65) Prior Publication Data

US 2004/0001154 A1    Jan. 1, 2004

(51) Int. Cl.
*H04N 5/00* (2006.01)
*H04N 5/91* (2006.01)

(52) U.S. Cl. .................. 386/117; 386/95; 386/118; 348/231.4; 348/376

(58) Field of Classification Search ......... 386/117–118, 386/95, 96; 348/231.4, 376
See application file for complete search history.

(56) References Cited

U.S. PATENT DOCUMENTS

| | | | |
|---|---|---|---|
| 3,958,869 A | 5/1976 | Beck | |
| 5,142,803 A | 9/1992 | Lang | |
| 5,258,880 A * | 11/1993 | Takahashi | 386/96 |
| 5,477,270 A | 12/1995 | Park | |
| 5,521,635 A | 5/1996 | Mitsuhashi et al. | |
| 5,548,335 A | 8/1996 | Mitsuhashi et al. | |
| 5,579,046 A | 11/1996 | Mitsuhashi et al. | |
| 5,594,494 A | 1/1997 | Okada et al. | |
| 5,778,082 A | 7/1998 | Chu et al. | |
| 5,778,083 A | 7/1998 | Godfrey | |
| 6,317,141 B1 * | 11/2001 | Pavley et al. | 715/732 |
| 6,442,601 B1 * | 8/2002 | Gampper et al. | 709/218 |
| 6,798,976 B2 * | 9/2004 | Tsumagari et al. | 386/95 |
| 6,990,671 B1 * | 1/2006 | Evans et al. | 386/95 |

OTHER PUBLICATIONS

B. Widrow, et al., "Adaptive Noise Cancelling: Principles and Applications" Proc. of the IEEE, vol. 63, No. 12, Dec. 1975.
Felix Rosenthal, "Air-Coupled Acoustic Sensor Workshop" DARPAI, Crystal City, Virginia, Aug. 1999.

* cited by examiner

*Primary Examiner*—Vincent F Boccio

(57) ABSTRACT

The invention relates to a method of indexing image data comprising the steps of acquiring image data representing a series of images, acquiring manually provided user cues for designating ones of the images, and indexing the image data in association with the manually provided user cues. The invention also relates to an apparatus for indexing image data comprising an image acquisition system operative for acquiring image data, a system operative for acquiring manually provided user cues, and an indexing device operative for indexing the acquired image data in association with the acquired manually provided user cues.

15 Claims, 3 Drawing Sheets

SYSTEM AND METHOD OF MANUAL INDEXING OF IMAGE DATA

FIELD OF THE INVENTION

The technical field relates to imaging systems, and more specifically to manual indexing schemes for image data.

BACKGROUND

Many image recording systems are able to acquire both audio information as well as image information from a recorded scene. Image recording systems like video cameras are often used to record events, like a child's birthday party, or to make creative works like movies. Image information from the recorded scene is stored by the recording system on an appropriate media such as video tape, a hard drive, or an optical storage device such as CD-ROM or DVD-ROM. Management of the stored information from an image recording system is important, particularly as the quantity of recorded information expands.

Current image information management systems employ content analysis that automatically or semi-automatically (i.e., with some manual input and/or processing) determines important cue scenes using visual cues. Once content analysis is complete a user may use the resulting index to jump directly to scenes indexed during the analysis process. However, automatic indexing using image data requires extensive processing to locate objects, scenes, or other cues that may be included in a cue index. Large recordings and recordings with variable content and frequent scene changes are particularly demanding of processing time. Semi-automatic indexing only partially eases the processing time required for visual data, and requires user involvement in the creation of an index.

SUMMARY OF THE INVENTION

The invention relates to a method of indexing image data comprising the steps of acquiring image data representing a series of images, acquiring manually provided user cues for designating ones of the images, and indexing the image data in association with the manually provided user cues. The invention also relates to an apparatus for indexing image data comprising an image acquisition system operative for acquiring image data, a system operative for acquiring manually provided user cues, and an indexing device operative for indexing the acquired image data in association with the acquired manually provided user cues.

DETAILED DESCRIPTION

Image acquisition devices enable the capture and storage of representations of visual messages of, for example, three-dimensional scenes and objects. Commonly found image acquisition devices include photographic and digital cameras, thermal imagers, x-ray and computed axial tomography machines, magnetic resonance imaging machines, telescope and microscope imaging systems, video camcorders and similar devices. Image data may be stored using physical storage media such as photographic films and paper, or may be stored as analog or digital information on various types of electronic storage media, such as magnetic tapes and disks, digital storage devices and optical recording media. Image data files are often quite large and may be difficult to manage. However, image data file indexing may allow a user to easily find specific images of interest quickly in a series or collection of images.

Figure 1:
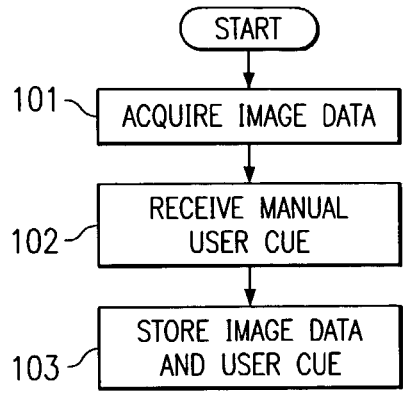
FIG. 1 is a flow diagram of a method of manual indexing according to an embodiment of the invention.

FIG. 1 is a flow diagram of a method of manual indexing according to an embodiment of the invention. In step 101, a user may acquire image data using an image acquisition device. As mentioned above, the image acquisition devices may be any of varied types and forms of devices capable of capturing multidimensional data representative of a multidimensional physical object such as an image of the object. In step 102, a user manually provides user cues to be received by a device for storage. The cues may be used to designate and/or label corresponding image content for subsequent reference, retrieval, processing, indexing, etc.

Manual user cues may be mechanical user cues from device-recognized mechanical input methods, such as a user-activated switch or a user-depressed button, or keyboard or touch-screen input from a user. In some embodiments, manual user cues may be in the form of audio user cues such as verbal utterances or key words spoken by a user. In a preferred embodiment, the user cues are provided contemporaneously with image acquisition to label the corresponding portion of image data, but user cues may be provided at a time other than during image acquisition.

The manual user cues may be received by the image acquisition device, but other devices may receive manual user cues in other embodiments. For example, user cues may be provided during review or editing of acquired image data. In step 103, the acquired image data and manual user cues may be stored in association with each other, e.g., the cues referencing portions of the image data. In a preferred embodiment, the image acquisition device may store both the acquired image data and the user cues on a common storage device, but in other embodiments, separate storage devices may store the image data and the user cues.

Figure 2:
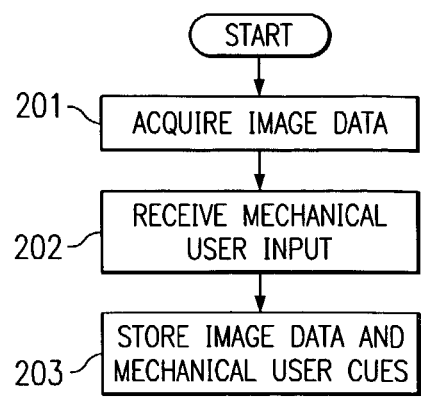
FIG. 2 is a flow diagram of a method of manual indexing using a function button according to another embodiment of the invention.

FIG. 2 is a flow diagram of steps included in a method according to another embodiment of the invention. In step 201, a user may acquire image data using an image acquisition device. In step 202, a user may provide a mechanical user input representing a cue. In a preferred embodiment, an image acquisition device includes one or more function buttons that a user may select while acquiring image data so as to designate and/or label the data. Specific function buttons may be selected in response to images acquired contemporaneously with function button selection.

For example, in one embodiment, a user may select a specific function button whenever one type of image is acquired to provide an appropriate label, and may select a different function button whenever another type of image is recorded. In other embodiments, mechanical input devices other than function buttons may be used, such as keyboards, mouse buttons, touch-screen displays, switches, and toggles in any number or combination. In step 203, image data and mechanical user cues are stored. In a preferred embodiment, the image acquisition device may store both acquired image data and mechanical user cue data in response to the user function button input, but in other embodiments, separate storage devices may store image data and mechanical user cues.

Figure 3:
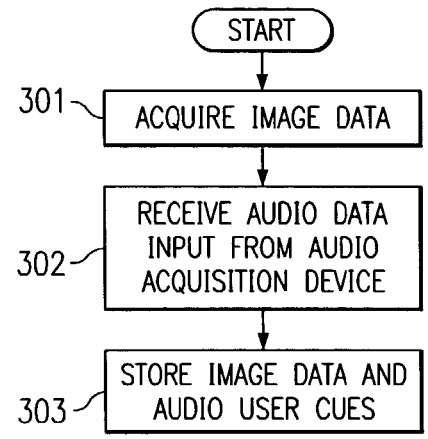
FIG. 3 is a flow diagram of a method of manual indexing using voice input according to another embodiment of the invention.

FIG. 3 is a flow diagram of a method according to another embodiment of the invention. In step 301, a user may acquire image data using an image acquisition device. In step 302, audio data input may be received by an audio acquisition device. In a preferred embodiment, audio data input is received by an audio acquisition device attached to the image acquisition device. The image acquisition device may then receive audio data input from the audio acquisition device. Audio acquisition devices may include microphones, audio transducers, or devices capable of converting audio to electronic, electromagnetic or mechanical signals.

In other embodiments, the audio acquisition device may be located separately from the image acquisition device. In some embodiments, audio data from an audio acquisition device may be further processed to isolate audio user cues from the audio data to identify commands, key words, etc. For embodiments using more than one audio acquisition device, word recognition may be incorporated using techniques similar to that disclosed in U.S. Pat. No. 5,521,635 by Mitsuhashi et al., issued May 28, 1996, the disclosure of which is hereby incorporated in its entirety. The isolated audio user cues may be stored as a separate file (either in its original or processed form) or may be integrated with other audio data or with image data files.

In step 303, image data and audio user cues are stored. In a preferred embodiment, the image acquisition device may store both the acquired image data and the audio user cues, but in other embodiments, separate storage devices may store the image data and the audio user cues. In embodiments that include both audio and mechanical user cues, step 303 may store acquired user cues of both types.

Figure 4:
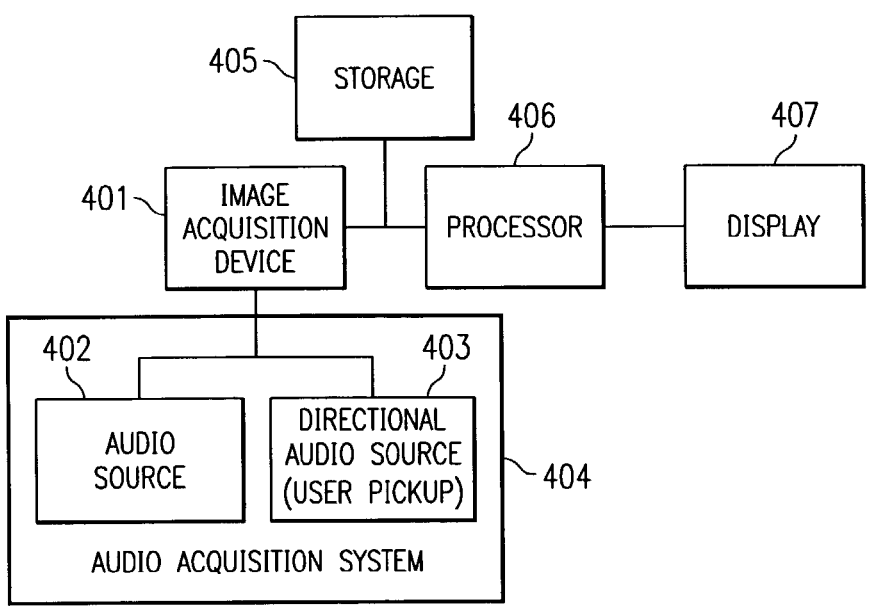
FIG. 4 is a block diagram of a system according to an embodiment of the invention.

FIG. 4 is a block diagram of a system according to an embodiment of the invention. Image acquisition device 401 is connected to receive an input from both audio acquisition device 402 and directional audio acquisition device 403. Audio acquisition device 402 and directional audio acquisition device 403 together comprise audio acquisition system 404. In some embodiments of the present invention, directional audio acquisition device 403 may be a user pickup or microphone directed to receive aural information generated by a user. Note that a preferred embodiment includes such an audio acquisition system, but other embodiments may not include all or a portion of such a system. Devices used as audio acquisition device 402 or directional audio acquisition device 403 may include such devices as microphones, audio transducers, or other devices capable of detecting aural information. In one embodiment, image acquisition device 401 may be connected to storage 405. Storage 405 may be in the form of solid state random-access memory, magnetic media such as a hard drive or video tape, or optical storage such as CD-ROM or DVD-ROM formats. In some embodiments, storage 405 may also be a network server. Processor 406 and display 407 are connected to image acquisition device 401 in a manner that allows transfer of image data from image acquisition device 401 for use by processor 406. In some embodiments, transfer connections may include direct electrical connection via appropriate hard-wired connections. Other embodiments may use wireless transfer methods incorporating sonic or electromagnetic signals. Display 407 is connected to processor 406 in a manner that allows for the communication and display of processed image data to a user.

Figure 5:
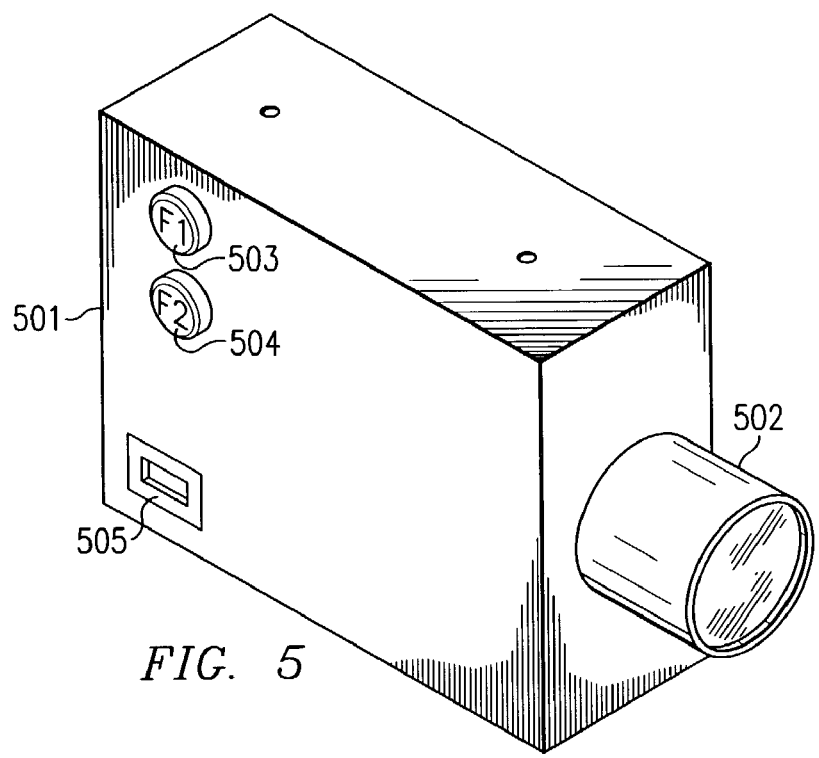
FIG. 5 is a front perspective view of a model image acquisition device according to an embodiment of the invention.

FIG. 5 is a front perspective view of an image acquisition device according to an embodiment of the invention. Image acquisition device 501 may be in the form of a typical video camcorder including lens system 502 for image acquisition. Image acquisition device 501 also may include first function button 503. Note that additional function buttons such as second function button 504 may also be included. In some embodiments, a user may use first function button 503 and second function button 504 to input manual user cues. The image acquisition device may also include port 505 for transferring image and audio data for indexing or playback on another device (e.g., a video cassette recorder).

Figure 6:
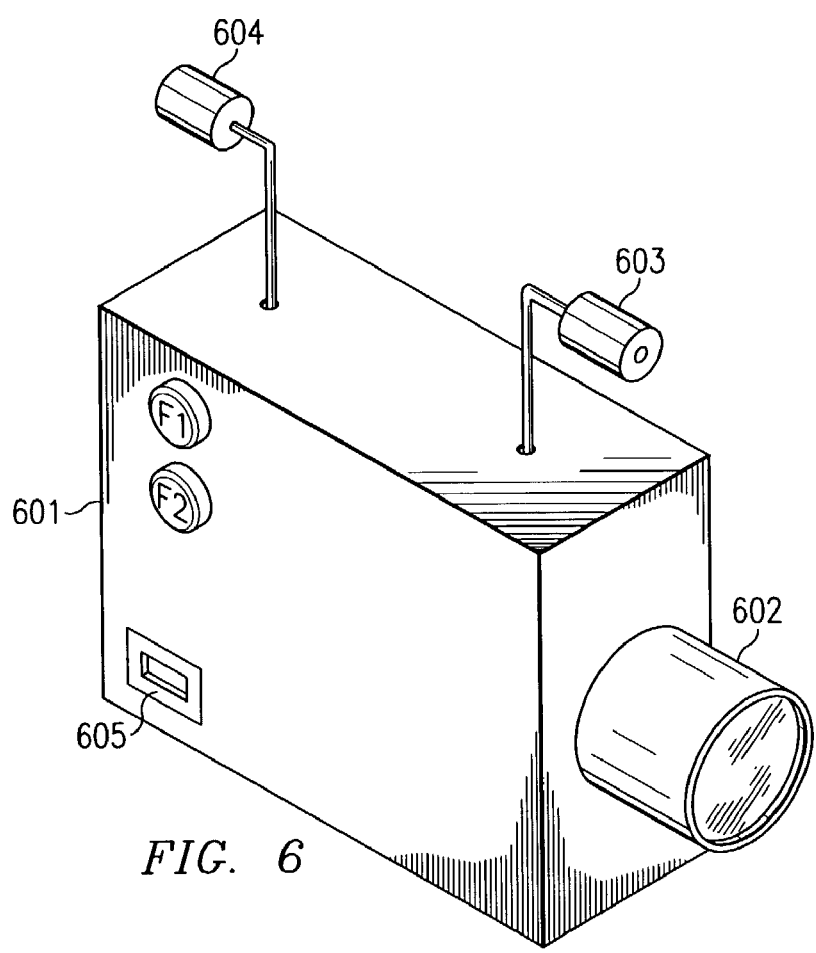
FIG. 6 is a front perspective view of a model image acquisition device according to another embodiment of the invention.

FIG. 6 is a front perspective view of an image acquisition device according to another embodiment of the invention. Image acquisition device 601 may include lens system 602 for image acquisition. First audio acquisition device 603 and second audio acquisition device 604 are connected to image acquisition device 602 in this embodiment, but may be separate from the image acquisition device in other embodiments. First audio acquisition device 603 may be located such that audio data from audio sources associated with the image acquisition device are acquired by first audio acquisition device 603. Second audio acquisition device 604 may be located to acquire user (i.e., operator) voice audio data. The image acquisition device may also include port 605 for transferring image and audio data for indexing or playback on another device. Note that in some embodiments, image acquisition device 601 may include function buttons, such as first function button 503 and second function button 504 shown in FIG. 5.

Figure 7:
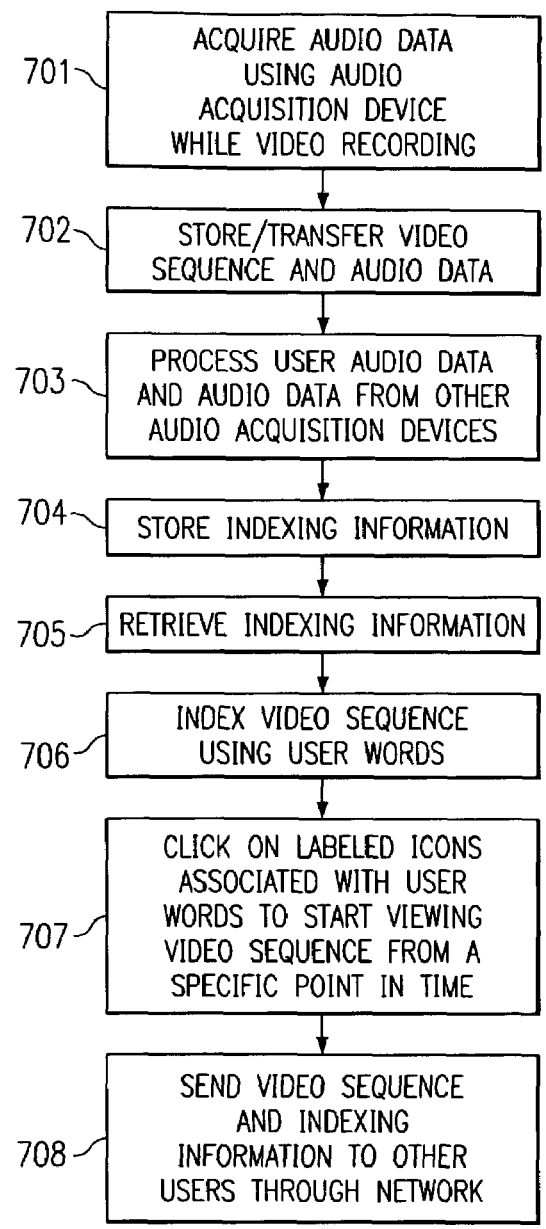
FIG. 7 is a flow diagram of a method according to an embodiment of the invention.

FIG. 7 is a flow diagram of a method according to an embodiment of the invention. In step 701, a user may acquire sequential video image data (i.e., video sequence) using an image acquisition device such as a video camera, digital camera, camcorder, thermal imager, etc. In a preferred embodiment, a user, while video recording, may acquire audio data from two or more audio sources using audio acquisition devices. One of the audio acquisition devices may be directed to capture audio from a subject of the image acquisition device and at least one of the other audio acquisition devices is directionally orientated in a manner to receive audio data from an operator of the device. Exemplary directionally orientated audio acquisition devices may include a directional microphone, a microphone close to the mouth of the user, a microphone with narrow-beam directivity, etc. The audio acquisition devices may be attached to the image acquisition device in some embodiments of the present invention. Audio data may be collected temporally with image data so that the audio data may accompany image information when the acquired data is played back for a user.

In a preferred embodiment, step 701 contemplates the collection of manual user cues using the image acquisition device. Collected manual user cues may be both mechanical user cues and audio user cues. Information regarding manual user cues may be stored as a separate data file, or may be encoded with the image data and/or audio data files. In a preferred embodiment, data files may be stored in an XML format so that the image data may be easily partitioned and indexed so as to be readily accessible. Indexing of the image data may occur when collected manual user cues are associated temporally with collected image data and collected audio data so that the user cues may be associated with a specific time during audio and image data collection.

In step 702, video sequence data and audio data collected in step 701 may be transferred to a processing device or to storage. In some embodiments, step 702 is optional and processing and storage steps may be accomplished using the image acquisition device if storage and a processor are located on the device. The image and audio data may be transferred separately to a processing device or to storage, or the data may be integrally transferred as a single file or data stream. Mechanical user cues collected in step 701 may be collected and transferred as a single file, or may be integrated with the image and/or audio data for transfer.

In step 703, user audio data from a directionally oriented audio acquisition device and audio data acquired by other audio acquisition devices may be processed. Processing may include filtering and/or noise cancellation of audio data to eliminate noise unwanted by the user. In a preferred embodiment, audio data from the directionally oriented audio acquisition device may be further processed using noise cancellation to isolate user word input from the audio data, and word recognition may be incorporated to identify audio cues for extraction from the audio data. The extracted audio cues may be stored as a separate file or may be integrated with other audio data.

In step 704, audio data processed in step 703 may be stored. Indexing information in the form of audio user cues and mechanical user cues may be stored along with the processed audio data. In some embodiments, stored data may be immediately retrieved for index processing.

In step 705, audio and image data that was stored in step 704 may be retrieved from storage. If indexing information was stored separately in step 704, indexing information may also be retrieved in step 705.

In step 706, the image data collected in step 701 may be indexed in response to user voice indexing commands using an indexing device. An indexing device may be an image acquisition device, a computer, or some other device capable of displaying image data to be indexed and receiving user input to control the indexing process. In a preferred embodiment, a user may be able to view image data using display devices such as an LCD screen or a computer monitor. Indexing image data may involve review of image data by the user and selection by the user of specific image data points of interest. In an embodiment of the present invention, a user may index image data by entering a manual cue when an image data point of interest has been located.

In a preferred embodiment, the location of the specific image data points may be saved in a separate index file, but in other embodiments the image data file itself may be modified with a marker for subsequent review (e.g., a separate index file referencing video timing may be used or a video signal may contain the index marks as part of a time code, control signal, or otherwise). The selected image data points may be saved by the indexing device so that subsequent review of the image data allows a user to address and go directly to the saved image data using the index. The display device may be integral to the image acquisition device or may be separate.

While viewing the image data, a user may annotate the image data with indexing-device recognized input, such as by typing or speaking a word, or by operating a function button or other communication device. Manual user cues acquired in step 701 may be used in step 706 to index the image data. In one embodiment, depressing a function key on the indexing device will automatically select and display the image data point at which a corresponding function key was depressed during image data acquisition. In a similar manner, some embodiments of the invention may accept user voice data during indexing and may find identical audio user cues in the audio data associated with the image data file, allowing a user to select image data using word input.

User voice data may also be used to cue image data by starting image data playback at a point containing the audio user cue. Annotating image data with manual user cues may also involve modification of image header information. In some embodiments, image data may be stored using a series of frames, each frame (or series of frames such as defined by the MPEG standard) representing the acquired image at a specific time point during image data acquisition. Each of these frames may contain header information describing or otherwise associated with the time at which the frame was acquired. A user may annotate the information contained in the header, and may directly store indexing information in the frame header using input recognized by the indexing device. In a preferred embodiment, manual user cues of the type entered during image acquisition may be entered by the user in step 706 to index image data.

In some embodiments, computer icons may be associated with user annotations or index information to allow icon-mediated cueing. Icon-mediated cueing can be generally defined as a technique of allowing a user to click on labeled icons associated with user words to start viewing a video sequence from a specific point in time. In step 707, a user may type or speak words to be associated with an unlabelled icon displayed on the display device, converting the icon to a labeled icon. Thereafter, when the user selects the labeled icon, the indexing device may cue the image data display to the specific frames or data points associated with the icon-mediated user word.

In step 708, video sequences and indexing information may be sent to other users through a network. Indexed image data, audio data, and/or index data may be sent to other users by a computer network or other electronic transfer method.

Figure 8:
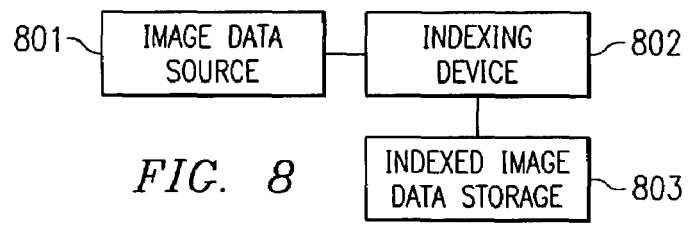
FIG. 8 shows an apparatus according to an embodiment of the present invention.

FIG. 8 shows an apparatus according to an embodiment of the present invention. Image data source 801 may be any of a number of image acquisition devices, or may be a storage device or computer in some embodiments. Image data source 801 may be equipped to acquire manual user cues, or manual user cues may be added at a later time. Image data source 801 may be connected to indexing device 802 using any of a number of connection types for transferring data. Indexing device 802 may be a computer in some embodiments of the present invention. In a preferred embodiment, indexing device 802 may have functionality for accepting manual user cues for indexing image data obtained from image data source 801. Indexing device 802 may also have functionality for filtering audio data and identifying user voices obtained from image data source 801. Indexing device 802 may be connected to a device for indexed image data storage 803, such as a storage device or computer. Note that in some embodiments of the present invention, indexing device 802 and indexed image data storage 803 may be the same device.

What is claimed is:

1. A method of indexing image data comprising:
   acquiring from a three-dimensional scene image data representing a series of images of the three-dimensional scene;
   acquiring, during the acquiring the image data, manually provided user cues for designating ones of said images, one of the manually provided user cues includes audio data acquired from an audio user input, wherein the acquired audio data includes user voice data;
   transferring said acquired audio data to a storage device for storage as one of said manually provided user cues; and indexing said acquired image data in accordance with said manually provided user cues by:
acquiring new user voice data; and
indexing said acquired image data by matching said new user voice data with said user voice data of said one of said manually provided user cues.

2. The method of claim 1 further comprising:
transferring said acquired image data from an image acquisition device to the storage device.

3. The method of claim 1 further comprising;
detecting speech from said acquired audio data to provide user voice data.

4. The method of claim 3 further comprising:
processing said audio data by isolating and extracting the user voice data from said acquired audio data; and
using said extracted user voice data as one of said manually provided user cues.

5. The method of claim 1 wherein said step of acquiring image data representing a series of images and said step of acquiring manually provided user cues are operative in combination to generate image and audio data formatted in an XML format.

6. The method of claim 1 wherein aid indexing step further comprises:
annotating said acquired image data using manually provided user cues recognized by indexing device.

7. The method of claim 6 wherein said annotating step comprises:
annotating said acquired image data with header information.

8. The method of claim 6 wherein said indexing step further comprises:
selecting said acquired image data for indexing using user word input.

9. The method of claim 6 wherein said indexing step further comprises:
cueing step that starts indexed image data playback at a point associated with a selected manually provided user cue.

10. The method of claim 9 wherein said indexing step further comprises:
associating user words with unlabelled icon for icon-mediated cueing.

11. The method of claim 1, wherein:
acquiring the image data includes an image acquisition system acquiring the image data with an image acquisition system;
acquiring the manually provided user cues includes a system acquiring a mechanical user input and said audio user input as some of the manually provided user cues; and
indexing said image data includes an indexing device indexing said image data.

12. The method of claim 1, acquiring the manually provided user cues comprises:
acquiring said audio user input with an audio acquisition system having a plurality of audio acquisition devices for acquiring audio dam, at least one of which is configured to acquire user voice data corresponding to said audio data as one of the manually provider user cues.

13. The method of claim 11 wherein said image acquisition system, said system for acquiring said mechanical user input and said audio user input, and said indexing device are a video camera.

14. The method of claim 11, further comprising:
said indexing device displaying icons and enabling user association of manual provided user cues with displayed icons.

15. The method of claim 12, further comprising:
acquiring, during the acquiring the image data, audio dam from the three-dimensional scene that is associated with the image data and different from said audio data for said one manually provided user cue.

* * * * *

UNITED STATES PATENT AND TRADEMARK OFFICE
CERTIFICATE OF CORRECTION

PATENT NO. : 7,444,068 B2  Page 1 of 1
APPLICATION NO. : 10/184428
DATED : October 28, 2008
INVENTOR(S) : Pere Obrador It is certified that error appears in the above-identified patent and that said Letters Patent is hereby corrected as shown below:

In column 7, line 11, in Claim 3, delete "comprising;" and insert -- comprising: --, therefor.

In column 7, line 14, in Claim 4, delete "claim 3" and insert -- claim 1 --, therefor.

In column 7, line 15, in Claim 4, after "said" insert -- acquired --.

In column 7, line 25, in Claim 6, delete "aid" and insert -- said --, therefor.

In column 8, line 22, in Claim 12, delete "dam," and insert -- data, --, therefor.

In column 8, line 34, in Claim 15, delete "dam" and insert -- data --, therefor.

Signed and Sealed this

Seventeenth Day of March, 2009

JOHN DOLL
*Acting Director of the United States Patent and Trademark Office*